(12) United States Patent
Cheng et al.

(10) Patent No.: US 11,800,046 B2
(45) Date of Patent: *Oct. 24, 2023

(54) VIDEO TRANSMISSION SYSTEM

(71) Applicant: NOVATEK MICROELECTRONICS CORP., HsinChu (TW)

(72) Inventors: Jhih-Siou Cheng, New Taipei (TW); Yi-Chuan Liu, Hsinchu County (TW); Hung-Cheng Hsiao, Hsinchu (TW); Ying-Wen Chou, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 150 days.

This patent is subject to a terminal disclaimer.

(21) Appl. No.: 16/807,802

(22) Filed: Mar. 3, 2020

(65) Prior Publication Data

US 2020/0204743 A1 Jun. 25, 2020

Related U.S. Application Data

(63) Continuation of application No. 15/676,956, filed on Aug. 14, 2017, now Pat. No. 10,616,505, which is a
(Continued)

(30) Foreign Application Priority Data

May 8, 2014 (TW) .................................. 103116386

(51) Int. Cl.
*H04N 5/268* (2006.01)
*H04N 5/38* (2006.01)
(Continued)

(52) U.S. Cl.
CPC ......... *H04N 5/268* (2013.01); *G06F 13/4086* (2013.01); *H04N 5/38* (2013.01); *H04N 5/44* (2013.01)

(58) Field of Classification Search
CPC . H04N 5/268; H04N 5/38; H04N 5/44; G06F 13/4086
See application file for complete search history.

(56) References Cited

U.S. PATENT DOCUMENTS 5,539,430 A 7/1996 Priem et al.
6,191,663 B1 * 2/2001 Hannah .................... H04B 3/20
333/32

(Continued)

FOREIGN PATENT DOCUMENTS

CN 101295476 A 10/2008
CN 103544928 A 1/2014

*Primary Examiner* — Wing H Chow
(74) *Attorney, Agent, or Firm* — JCIPRNET

(57) ABSTRACT

A video transmission system is disclosed. The video transmission system comprises a multi-drop bus, a first source driving chip, a second source driving chip and a timing controller. The first source driving chip comprises a first source driving circuit and a first terminal circuit. The first terminal circuit is coupled to the multi-drop bus and the first source driving circuit for providing a first terminal resistor. The second source driving chip comprises a second source driving circuit and a second terminal circuit. The second terminal circuit is coupled to the multi-drop bus and the second source driving circuit for providing a second terminal resistor. The timing controller is coupled to the first source driving chip and the second source driving chip via the multi-drop bus.

14 Claims, 11 Drawing Sheets

Related U.S. Application Data continuation of application No. 14/328,078, filed on Jul. 10, 2014, now Pat. No. 9,800,800.

(51) Int. Cl.
  *H04N 5/44* (2011.01)
  *G06F 13/40* (2006.01)

(56) References Cited

U.S. PATENT DOCUMENTS

| | | | |
|---|---|---|---|
| 2004/0003331 A1* | 1/2004 | Salmon | G11C 29/50012 |
| | | | 714/738 |
| 2008/0170052 A1 | 7/2008 | Ryu | |
| 2008/0170063 A1 | 7/2008 | Ryu | |
| 2009/0267654 A1 | 10/2009 | Hinz et al. | |
| 2010/0225637 A1 | 9/2010 | Jeon et al. | |
| 2011/0267101 A1 | 11/2011 | Oh et al. | |
| 2012/0056870 A1 | 3/2012 | Koh | |
| 2014/0192583 A1 | 7/2014 | Rajan et al. | |
| 2016/0043761 A1* | 2/2016 | Kim | H03F 1/3223 |
| | | | 375/346 |

* cited by examiner

VIDEO TRANSMISSION SYSTEM

This application is continuation application of U.S. patent application Ser. No. 15/676,956 filed Aug. 14, 2017, which is a continuation application of U.S. patent application Ser. No. 14/328,078 filed Jul. 10, 2014 (issued on Oct. 24, 2017, as U.S. Pat. No. 9,800,800), which claims the benefit of Taiwan application Serial No. 103116386, filed May 8, 2014, the contents of which are incorporated herein by reference.

BACKGROUND OF THE INVENTION

Field of the Invention

The invention relates in general to a transmission system, and more particularly to a video transmission system.

Description of the Related Art

Display is an electronic product that has been widely used. To provide truthful and vivid frames, both the resolution and the refresh rate of the display must be increased, and display of high-speed applications is thus provided. Facing the requirements of high-speed applications, the reflection and decay of transmission lines will make it difficult to increase the refresh rate of the display. Therefore, the transmission lines must have suitable impedance matching.

In the multi-drop configuration of the display, single output channel of the timing controller is coupled to a plurality of source driving chips via a pair of transmission lines. According to the conventional method, a terminal resistor is disposed on the part of a printed circuit board closest to an input terminal of a source driving chip to match the impedance of the transmission line. However, when the terminal resistor disposed on the printed circuit board does not match the impedance of the transmission line, signals will be reflected and result in transmission distortion.

SUMMARY OF THE INVENTION

The invention is directed to a video transmission system.

According to one embodiment of the present invention, a video transmission system is disclosed. The video transmission system comprises a multi-drop bus, a first source driving chip, a second source driving chip and a timing controller. The first source driving chip comprises a first source driving circuit and a first terminal circuit. The first terminal circuit is coupled to the multi-drop bus and the first source driving circuit for providing a first terminal resistor. The second source driving chip comprises a second source driving circuit and a second terminal circuit. The second terminal circuit is coupled to the multi-drop bus and the second source driving circuit for providing a second terminal resistor. The timing controller is coupled to the first source driving chip and the second source driving chip via the multi-drop bus.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
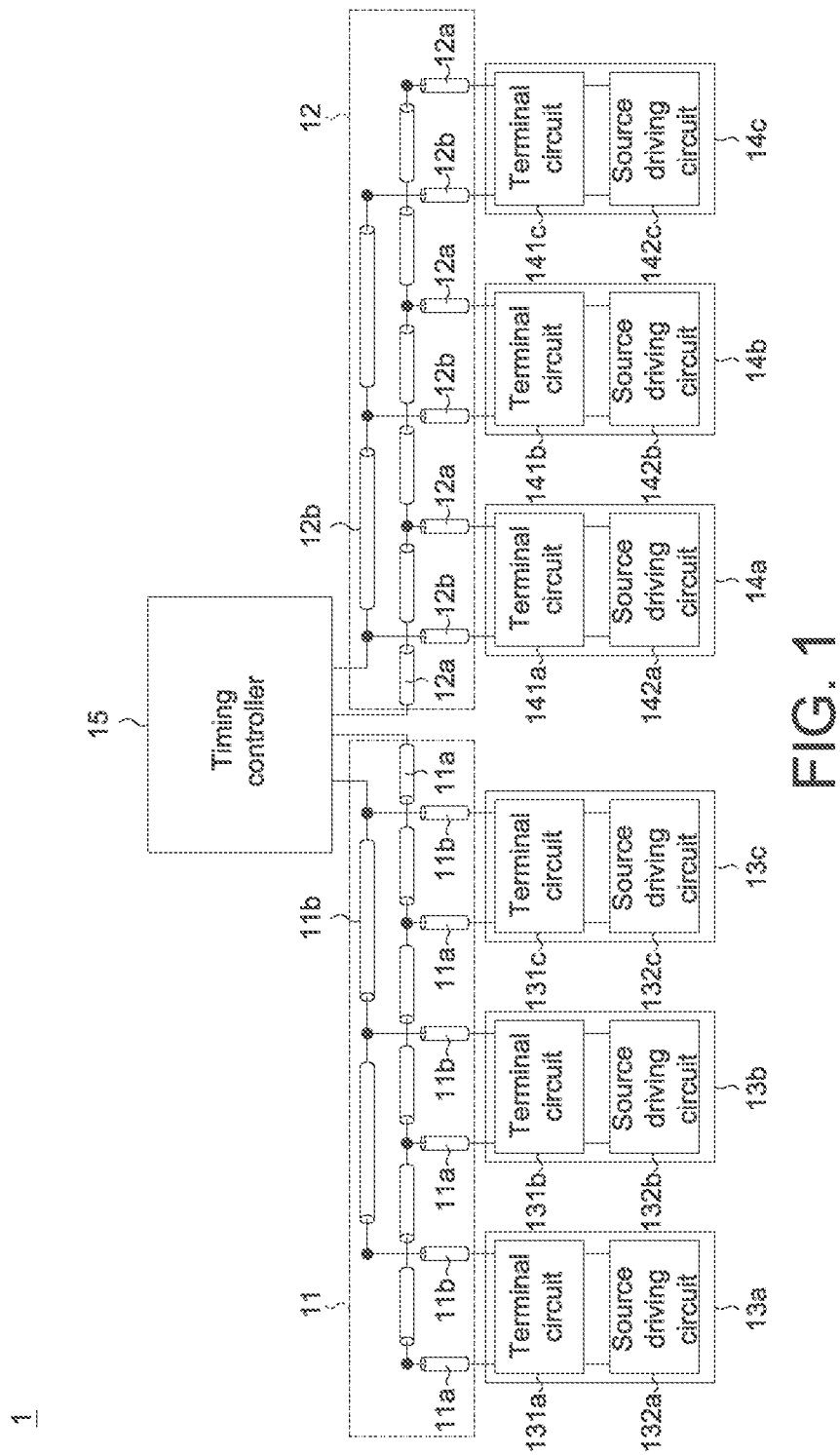
FIG. 1 is a schematic diagram of a video transmission system according to a first embodiment.

Referring to FIG. 1, a schematic diagram of a video transmission system according to a first embodiment is shown. The video transmission system 1 comprises a multi-drop bus 11, a multi-drop bus 12, source driving chips 13a~13c, source driving chips 14a~14c and a timing controller 15. The timing controller 15 is coupled to the source driving chips 13a~13c via the multi-drop bus 11, and is coupled to the source driving chips 14a~14c via the multi-drop bus 12. The source driving chip 13a comprises a terminal circuit 131a and a source driving circuit 132a. The terminal circuit 131a is coupled to the multi-drop bus 11 and the source driving circuit 132a for providing a terminal resistor. The source driving chip 13b comprises a terminal circuit 131b and a source driving circuit 132b. The terminal circuit 131b is coupled to the multi-drop bus 11 and the source driving circuit 132b for providing a terminal resistor. The source driving chip 13c comprises a terminal circuit 131c and a source driving circuit 132c. The terminal circuit 131c is coupled to the multi-drop bus 11 and the source driving circuit 132c for providing a terminal resistor.

The source driving chip 14a comprises a terminal circuit 141a and a source driving circuit 142a. The terminal circuit 141a is coupled to the multi-drop bus 12 and the source driving circuit 142a for providing a terminal resistor. The source driving chip 14b comprises a terminal circuit 141b and a source driving circuit 142b. The terminal circuit 141b is coupled to the multi-drop bus 12 and the source driving circuit 142b for providing a terminal resistor. The source driving chip 14c comprises a terminal circuit 141c and a source driving circuit 142c. The terminal circuit 141c is coupled to the multi-drop bus 12 and the source driving circuit 142c for providing a terminal resistor.

The multi-drop bus 11 and the multi-drop bus 12 transmit data according to such as the format of mini low-voltage differential signaling (mini-LVDS). The multi-drop bus 11 comprises transmission lines 11a and 11b. The multi-drop bus 12 comprises transmission lines 12a and 12b. The timing controller 15 is coupled to the source driving chips 13a~13c via the transmission lines 11a and 11b. The timing controller 15 is coupled to the source driving chips 14a~14c via the transmission lines 12a and 12b.

Figure 2:
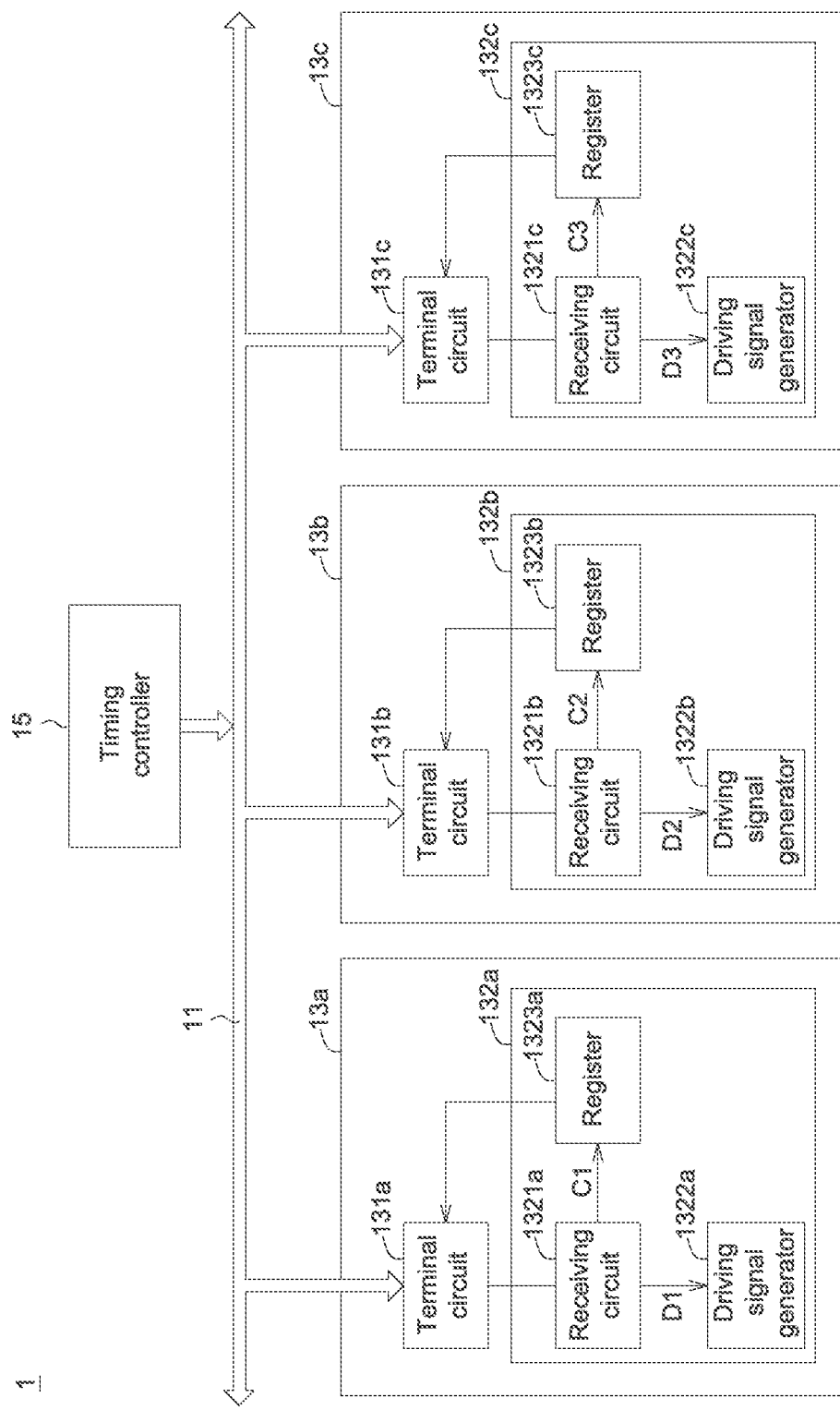
FIG. 2 is a partial schematic diagram of a video transmission system according to a first embodiment.
Figure 3:
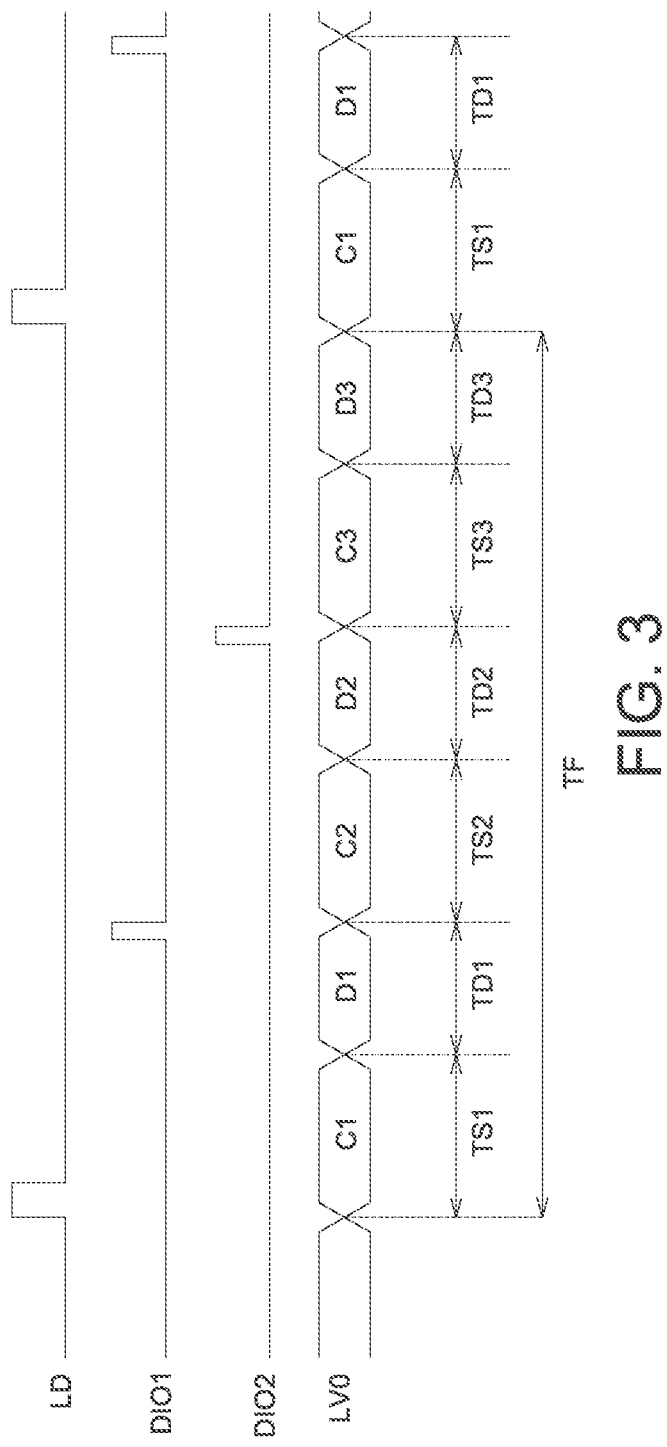
FIG. 3 is a timing diagram of video data transmission according to a first embodiment.

Refer to both FIG. 2 and FIG. 3. FIG. 2 is a partial schematic diagram of a video transmission system according to a first embodiment. FIG. 3 is a timing diagram of video data transmission according to a first embodiment. The source driving circuit 132a comprises a receiving circuit 1321a, a driving signal generator 1322a and a register 1323a. The source driving circuit 132b comprises a receiving circuit 1321b, a driving signal generator 1322b and a register 1323b. The source driving circuit 132c comprises a receiving circuit 1321c, a driving signal generator 1322c and a register 1323c.

Bus signal LV0 represents the setting command and video data transmitted via the multi-drop bus 11. The timing controller 15 transmits the bus signal LV0 to the source driving chips 13a~13c via the multi-drop bus 11. Download period LD indicates the start of each frame period TF. The timing controller 15 outputs the download signal LD to the source driving chip 13a. When the download signal LD appears, the receiving circuit 1321a receives a setting command C1 via the multi-drop bus 11 during a setting period TS1 and receives a video data D1 via the multi-drop bus 11 during a transfer period TD1. The transfer period TD1 is behind the setting period TS1. During the setting period TS1, the terminal circuit 131a provides a terminal resistor according to the setting command C1 and further connects the terminal resistor to the multi-drop bus 11. The driving signal generator 1322a outputs a corresponding source driving signal according to the video data D1. After the transfer period TD1 ends, the source driving chip 13a outputs a data input/output starting signal DIO1 to the source driving chip 13b.

After the data input/output starting signal DIO1 activates the source driving chip 13b, the receiving circuit 1321b receives a setting command C2 via the multi-drop bus 11 during a setting period TS2, and receives a video data D2 via the multi-drop bus 11 during a transfer period TD2. The transfer period TD2 is behind the setting period TS2. During the setting period TS2, the terminal circuit 131b provides a terminal resistor according to the setting command C2 and further connects the terminal resistor to the multi-drop bus 11. The driving signal generator 1322b outputs a corresponding source driving signal to the panel according to the video data D2. After the transfer period TD2 ends, the source driving chip 13b outputs a data input/output starting signal DIO2 to the source driving chip 13c.

After the data input/output starting signal DIO2 activates the source driving chip 13b, the receiving circuit 1321c receives a setting command C3 via the multi-drop bus 11 during a setting period TS3 and receives a video data D3 via the multi-drop bus 11 during a transfer period TD3. The transfer period TD3 is behind the setting period TS3. During the setting period TS3, the terminal circuit 131c provides a terminal resistor according to the setting command C3 and further connects the terminal resistor to the multi-drop bus 11. The driving signal generator 1322c outputs a corresponding source driving signal according to the video data D3.

In the above embodiments, the terminal circuits 131a~131c sequentially provide terminal resistors which can be connected in parallel via the multi-drop bus 11. However, the practical application is not limited to the above exemplification. In another embodiment, the terminal circuit 131a stops providing the terminal resistor after the transfer period TD1 ends. The terminal circuit 131b stops providing the terminal resistor after the transfer period TD2 ends. The terminal circuit 131c stops providing the terminal resistor after the transfer period TD3 ends. Thus, the terminal resistors provided by the terminal circuits 131a~131c will not be connected in parallel via the multi-drop bus 11. After the transmission of the video data is completed, all terminal circuits stop providing the terminal resistor.

Figures 4, 5:
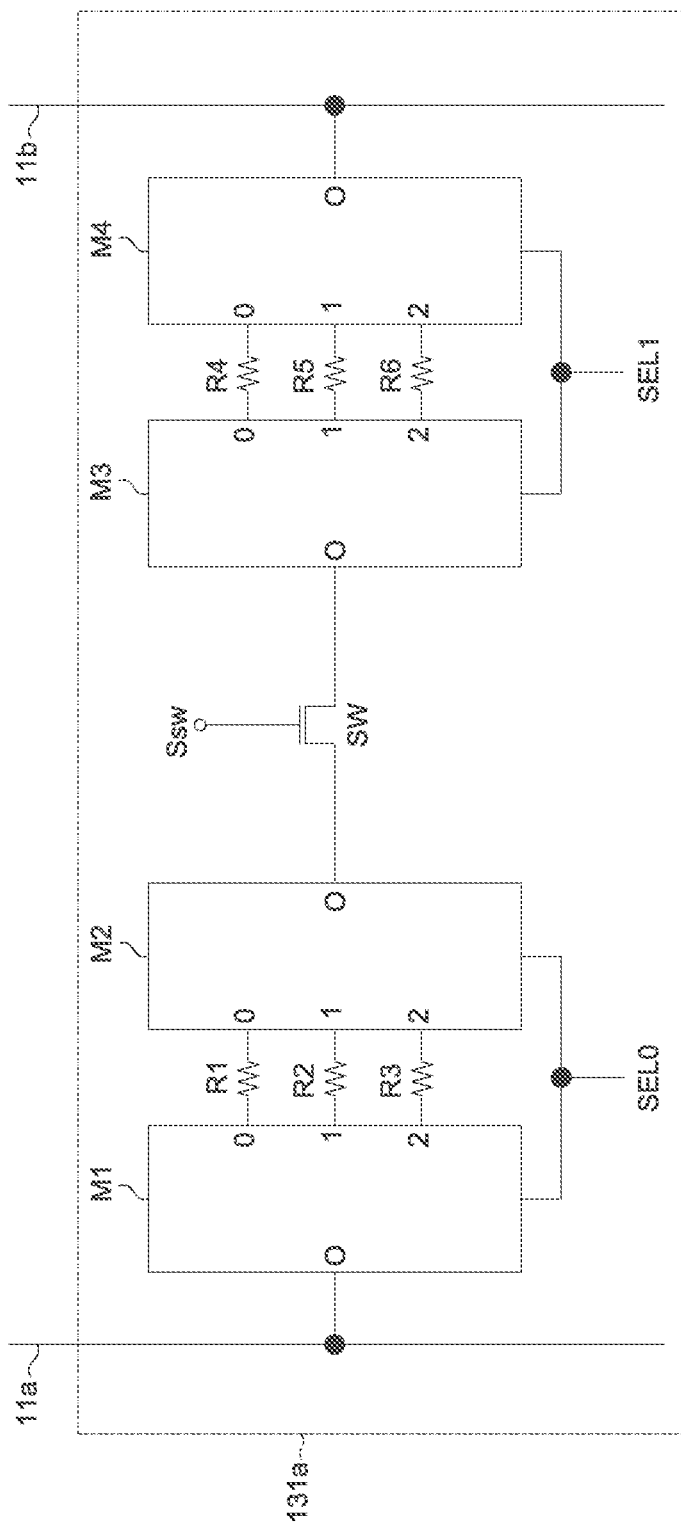
FIG. 4 is a schematic diagram of a terminal circuit according to a first embodiment.
FIG. 5 is a schematic diagram of a setting command according to a first embodiment.

Refer to FIG. 2, FIG. 4 and FIG. 5 at the same time. FIG. 4 is a schematic diagram of a terminal circuit according to a first embodiment. FIG. 5 is a schematic diagram of a setting command according to a first embodiment. The circuit design of the terminal circuits 131b and 131c can be identical to that of the terminal circuit 131a. The setting command C1 comprises a switch signal Ssw and selection signals SEL0 and SEL1. The terminal circuit 131a comprises resistors R1~R6, a selection circuit and a switch SW. The switch signal Ssw is used for controlling the switch SW. The resistors R1~R3 have different resistances, and the resistors R4~R6 have different resistances. The selection circuit comprises multiplexers M1~M4.

During the setting period TS1, the multiplexers M1 and M2 select one of the resistors R1~R3 as the first candidate resistor according to the selection signal SEL0 of the setting command C1. During the setting period TS1, the multiplexer M3 and M4 select one of the resistors R4~R6 as the second candidate resistor according to the selection signal SEL1 of the setting command C1. During the setting period TS1, the switch SW is turned on according to the switch signal Ssw of the setting command C1 to provide a terminal resistor. During the setting period TS1, if the multiplexer M1 and M2 select the resistor R1 as the first candidate resistor and the multiplexer M3 and M4 select the resistor R4 as the second candidate resistor, then the terminal resistor provided by the terminal circuit 131a is a serial connection of resistors R1 and R4.

Figure 6:
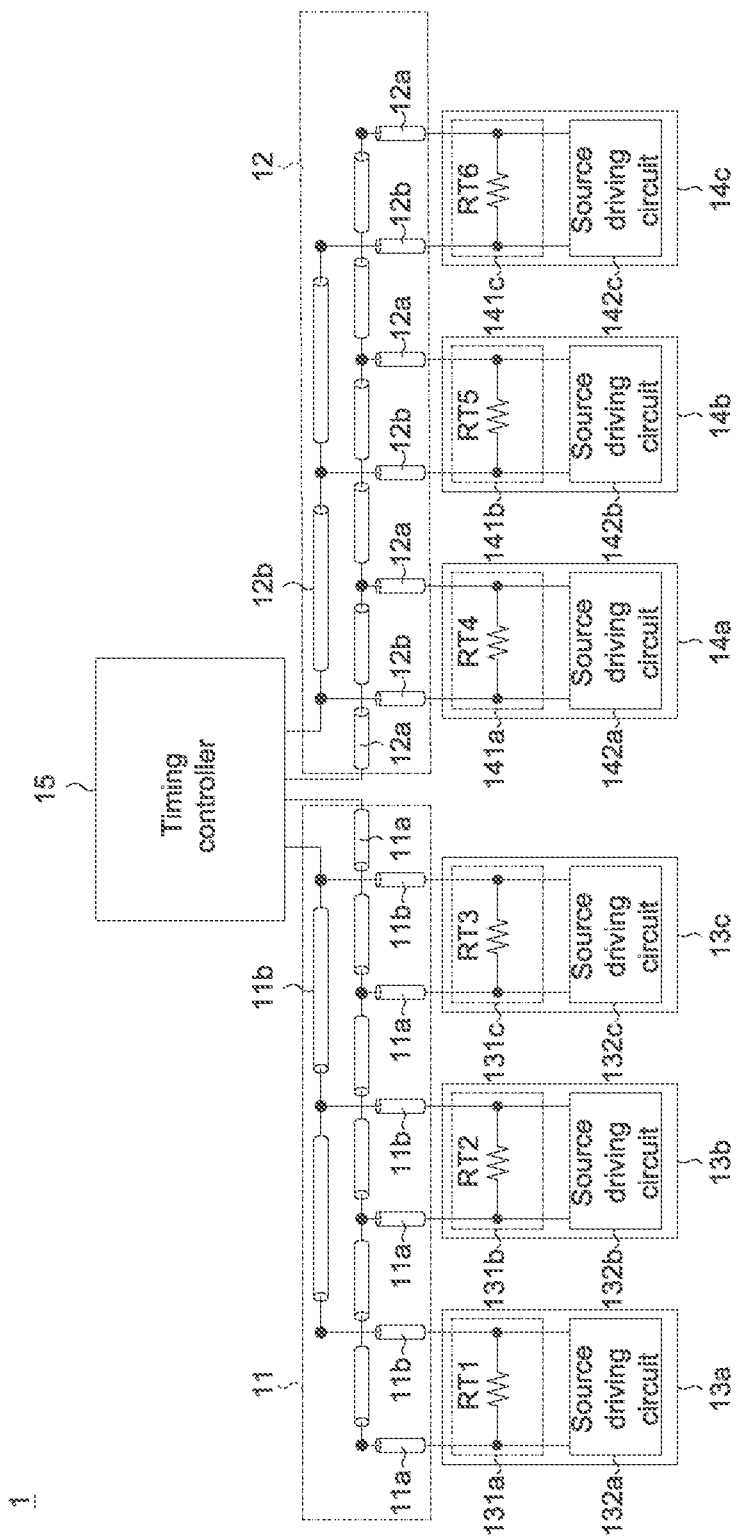
FIG. 6 is a schematic diagram of all terminal circuits concurrently providing terminal resistors.

Refer to FIG. 1, FIG. 4 and FIG. 6 at the same time. FIG. 6 is a schematic diagram of all terminal circuits concurrently providing terminal resistors. The terminal circuits 131a~131c respectively provide terminal resistors RT1~RT3. Two ends of the terminal resistors RT1~RT3 are concurrently coupled to the multi-drop bus 11. The terminal resistors RT1~RT3 can be formed by a combination of resistors R1~R6. For example, the terminal resistor RT1 can be realized by a serial connection of resistors R1 and R4. The terminal resistor RT2 can be realized by a serial connection of resistors R2 and R5. The terminal resistor RT3 can be realized by a serial connection of resistors R3 and R6. The terminal resistor RT1 and the terminal resistors RT2 and RT3 can be connected in parallel via the multi-drop bus 11. The terminal circuits 141a~141c respectively provide terminal resistors RT4~RT6, and two ends of terminal resistors RT4~RT6 are concurrently coupled to the multi-drop bus 12. The terminal resistor RT4 and the terminal resistors RT5 and RT6 can be connected in parallel via the multi-drop bus 12.

Figure 7:
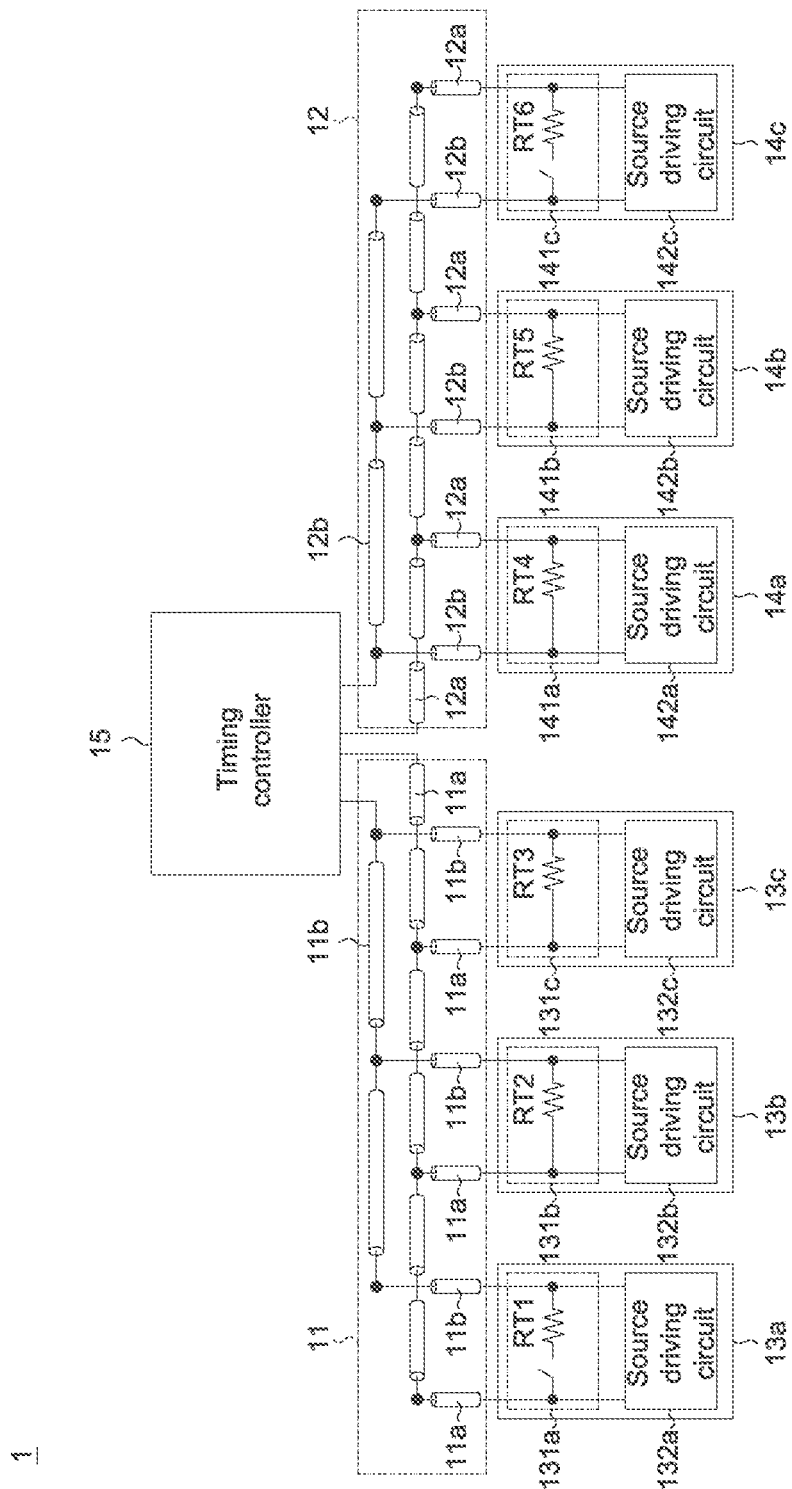
FIG. 7 is a schematic diagram of some of the terminal circuits providing a terminal resistor.

Refer to both FIG. 1 and FIG. 7. FIG. 7 is a schematic diagram of some of the terminal circuits providing a terminal resistor. The terminal circuits 131b, 131c, 141a and 141b respectively provide terminal resistors RT2, RT3, RT4 and RT5. The terminal circuits 131a and 141c do not provide terminal resistors RT1 and RT6. Two ends of the terminal resistors RT2 and RT3 are concurrently coupled to the multi-drop bus 11, and so are two ends of the terminal resistor RT4 and terminal resistor RT5 concurrently coupled to the multi-drop bus 12. Two ends of the terminal resistor RT1 are not concurrently coupled to the multi-drop bus 11, and nor are two ends of the terminal resistor RT6 concurrently coupled to the multi-drop bus 12.

Figure 8:
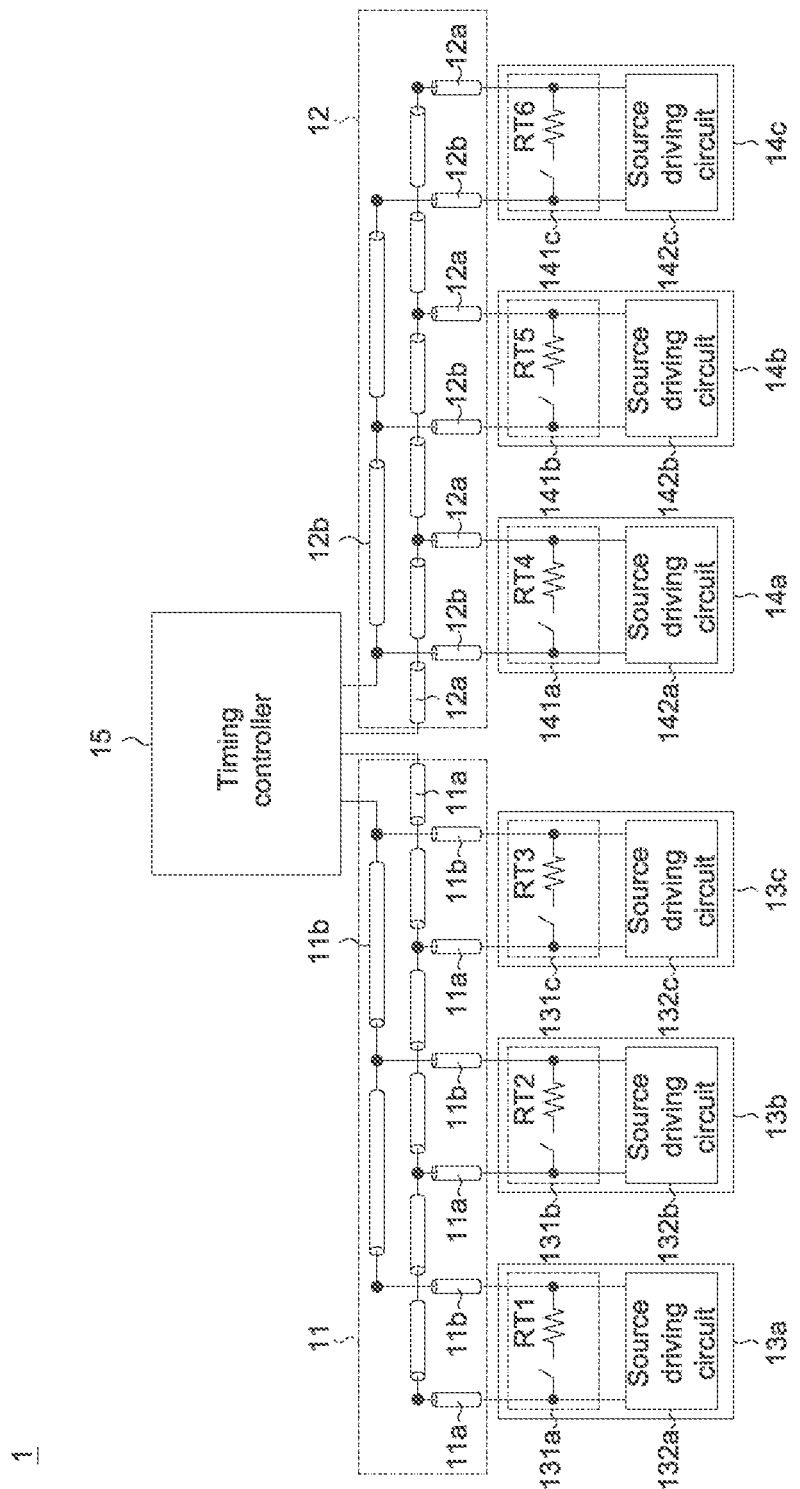
FIG. 8 is a schematic diagram of all terminal circuits concurrently not providing any terminal resistors.

Refer to both FIG. 1 and FIG. 8. FIG. 8 is a schematic diagram of all terminal circuits concurrently not providing any terminal resistors. The terminal circuits 131a~131c do not provide terminal resistors RT1~RT3 respectively. The terminal circuits 141a~141c do not provide terminal resistors RT4~RT6 respectively. Two ends of the terminal resistor RT1 are not concurrently coupled to the multi-drop bus 11, and nor are two ends of the terminal resistor RT2 concurrently coupled to the multi-drop bus 11. Two ends of the terminal resistor RT3 are not concurrently coupled to the multi-drop bus 11, and nor are two ends of the terminal resistor RT4 concurrently coupled to the multi-drop bus 12. Two ends of the terminal resistor RT5 are not concurrently coupled to the multi-drop bus 12, and nor are two ends of the terminal resistor RT6 concurrently coupled to the multi-drop bus 12.

Second Embodiment

Figure 9:
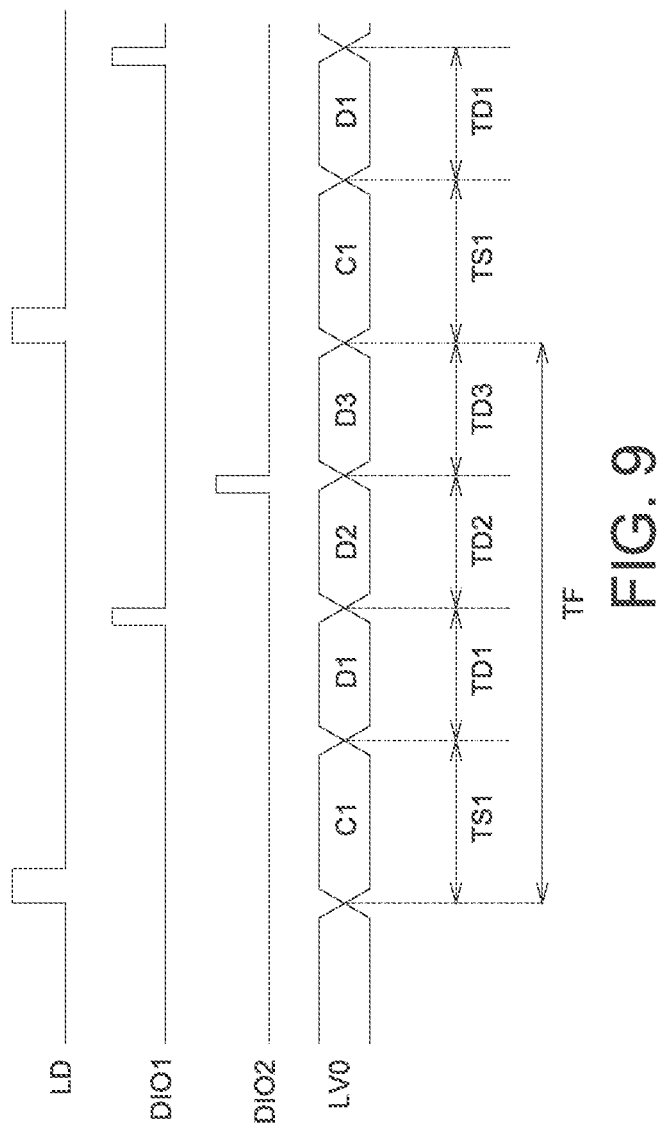
FIG. 9 is a timing diagram of video data transmission according to a second embodiment.

Refer to both FIG. 2 and FIG. 9. FIG. 9 is a timing diagram of video data transmission according to a second embodiment. The second embodiment is different from the first embodiment mainly in that during the setting period TS1, each of the terminal circuits 131a, 131b and 131c provides a terminal resistor according to the setting command C1 and further connects the terminal resistor to the multi-drop bus 11. Furthermore, the receiving circuit 1321a receives the setting command C1 via the multi-drop bus 11 during the setting period TS1 and receives the video data D1 via the multi-drop bus 11 during the transfer period TD1. During the setting period TS1, each of the terminal circuits 131a, 131b and 131c provides a terminal resistor according to the setting command C1 and further connects the terminal resistor to the multi-drop bus 11. The driving signal generator 1322a outputs a corresponding source driving signal according to the video data D1. After the transfer period TD1 ends, the source driving chip 13a outputs the data input/output starting signal DIO1 to the source driving chip 13b.

After the data input/output starting signal DIO1 activates the source driving chip 13b, the receiving circuit 1321b receives the video data D2 via the multi-drop bus 11 during the transfer period TD2. The transfer period TD2 is behind transfer period TD1. The driving signal generator 1322b outputs a corresponding source driving signal according to the video data D2. After the transfer period TD2 ends, the source driving chip 13b outputs the data input/output starting signal DIO2 to the source driving chip 13c. After the data input/output starting signal DIO2 activates the source driving chip 13b, the receiving circuit 1321c receives the video data D3 via the multi-drop bus 11 during the transfer period TD3. The transfer period TD3 is behind the transfer period TD2. The driving signal generator 1322c outputs a corresponding source driving signal according to the video data D3.

Third Embodiment

Figure 10:
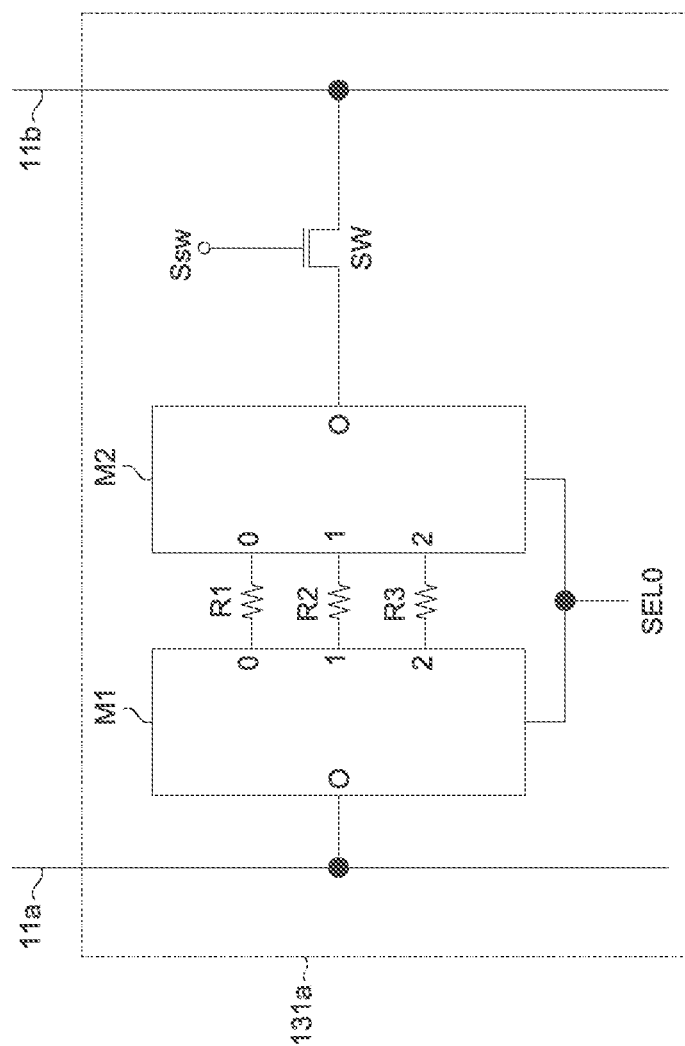
FIG. 10 is a schematic diagram of a terminal circuit according to a third embodiment.
Figure 11:
FIG. 11 is a schematic diagram of a setting command according to a third embodiment.

Refer to FIG. 2, FIG. 4, FIG. 5, FIG. 10 and FIG. 11 at the same time. FIG. 10 is a schematic diagram of a terminal circuit according to a third embodiment. FIG. 11 is a schematic diagram of a setting command according to a third embodiment. The third embodiment is different from the first embodiment mainly in that the terminal circuit 131a of the third embodiment does not comprise the multiplexers M3~M4 or the resistors R4~R6, and the setting command C1 of the third embodiment does not comprise the selection signal SEL1. During the setting period TS1, the multiplexers M1 and M2 select one of the resistors R1~R3 as a terminal resistor according to the selection signal SEL0 of the setting command C1. During the setting period TS1, the switch SW is turned on according to the switch signal Ssw of the setting command C1 to provide a terminal resistor.

Fourth Embodiment

Figure 12:
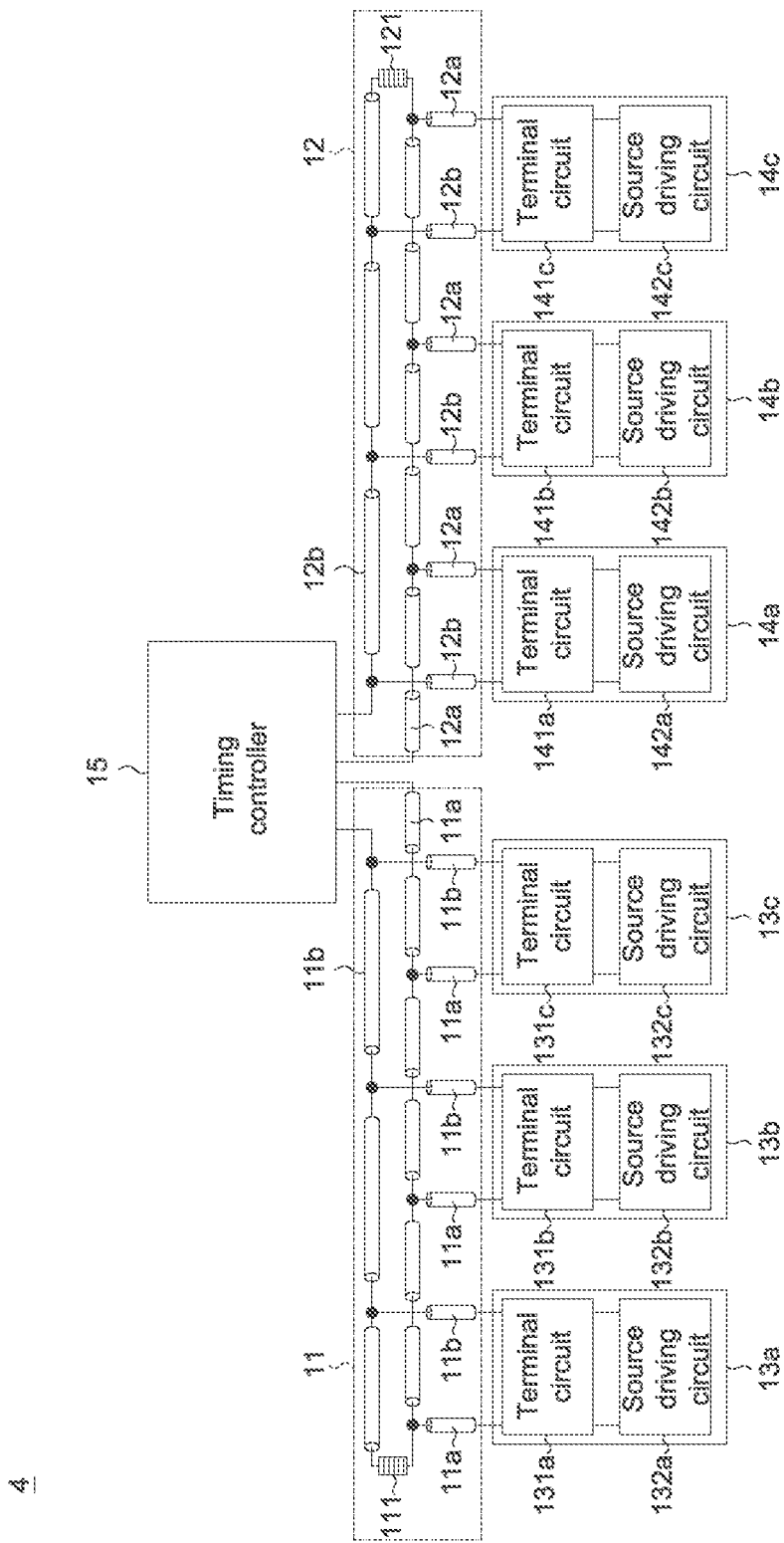
FIG. 12 is a schematic diagram of a video transmission system according to a fourth embodiment.

Refer to both FIG. 1 and FIG. 12. FIG. 12 is a schematic diagram of a video transmission system according to a fourth embodiment. The fourth embodiment is different from the first embodiment mainly in that the video transmission system 4 further comprises impedance matching elements 111 and 121. The impedance matching elements 111 and 121 can both be realized by such as a resistor, a capacitor or an inductor. The impedance matching element 111 is disposed in the multi-drop bus 11, and the impedance matching element 121 is disposed in the multi-drop bus 12. In addition to using the terminal resistors provided by the source driving chips 13a~13c and the source driving chips 14a~14c, the video transmission system 4 can further use the impedance matching elements 111 and 121 disposed outside the source driving chips 13a~13c and the source driving chips 14a~14c to increase the flexibility in the adjustment of impedance matching.

Fifth Embodiment

Figure 13:
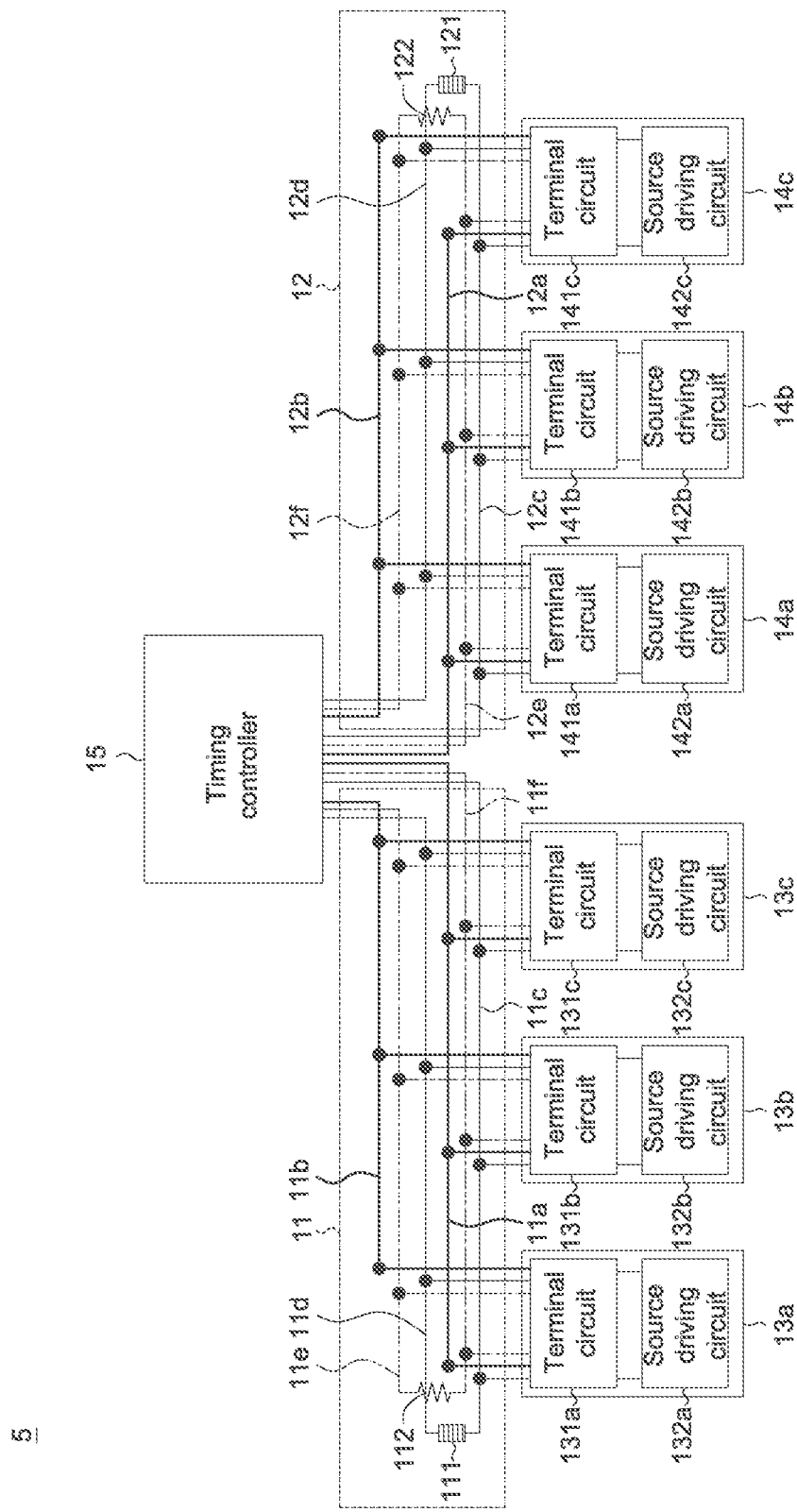
FIG. 13 is a schematic diagram of a video transmission system according to a fifth embodiment.

Refer to both FIG. 1 and FIG. 13. FIG. 13 is a schematic diagram of a video transmission system according to a fifth embodiment. The fifth embodiment is different from the first embodiment mainly in that the video transmission system 5 further comprises an impedance matching element 111, a terminal resistor 112, an impedance matching element 121 and a terminal resistor 122, and that the multi-drop bus 11 of the video transmission system 5 further comprises transmission lines 11c~11f and transmission lines 12c~12f. The impedance matching element 111 is disposed between transmission lines 11c and 11d. The impedance matching element 121 is disposed between the transmission lines 12c and 12d. The impedance matching element 111 can be incorporated with the impedance matching between the terminal resistor provided by the source driving chips 13a~13c and the transmission lines 11c and 11d. The impedance matching element 121 can be incorporated with the impedance matching between the terminal resistor provided by the source driving chips 14a~14c and the transmission lines 12c and 12d. The terminal resistor 112 is disposed between the transmission lines 11e and 11f. The terminal resistor 122 is disposed between the transmission lines 12e and 12f. The terminal resistor 112 is used for matching impedance with the transmission lines 11e and 11f. The terminal resistor 122 is used for matching impedance with the transmission lines 12e and 12f.

When a printed circuit board has a terminal resistor disposed therein, signals entering the source driving chip still have to pass through an impedance mismatching path, and the signals received by the source driving chip will be distorted. According to the video transmission system disclosed in above embodiments, terminal resistors are embedded in the source driving chip, hence shortening the impedance mismatching path and avoiding the signals received by the source driving chip being distorted. Besides, since the source driving chips are disposed at different positions, the resistances of the transmission lines between the timing controller and different source driving chips will be different accordingly. The terminal circuits disclosed in above embodiments are capable of flexibly adjusting the resistance of each terminal resistor, such that the source driving chips can achieve suitable impedance matching with the transmission lines.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A source driver for driving a display panel, configured to be coupled to a timing controller via at least one transmission line of a multi-drop bus, the source driver comprising:
    a source driving circuit, configured to drive the display panel; and
    a terminal circuit, configured to be coupled to the multi-drop bus and the source driving circuit, configured to provide an adjustable resistance, wherein the adjustable resistance is set in response to a setting command as represented by a bus signal being transmitted on the multi-drop bus and received from the timing controller during a setting period,
    wherein during a transfer period of the bus signal, the terminal circuit is configured to provide the adjustable resistance according to the setting command, and the source driving circuit is configured to receive video data, as represented by the bus signal, from the timing controller,
    wherein the setting period being used for setting the adjustable resistance according to the setting command is before the transfer period being used for transmitting the video data, and the setting command sets the adjustable resistance with one of a plurality of resistances for impedance matching.

2. The video transmission system according to claim 1, wherein
    the terminal circuit is configured to stop providing the adjustable resistance after the transfer period.

3. The source driver according to claim 1, wherein the terminal circuit is configured to continually provide a terminal resistor with the adjustable resistance after the transfer period.

4. The source driver according to claim 1, wherein the adjustable resistance is set for impedance matching on the multi-drop bus.

5. The source driver according to claim 1, wherein the adjustable resistance is set to different values depending upon resistances of the at least one transmission line and at least one other transmission line of the multi-drop bus.

6. The source driver according to claim 1, wherein the source driving circuit further comprises:
    a receiving circuit, configured to receive the setting command, which is represented by the bus signal and transmitted via the multi-drop bus during the setting period, wherein the receiving circuit is configured to receive the video data as represented by the bus signal and transmitted via the multi-drop bus during the transfer period, and the setting period and the transfer period are within a frame period; and
    a driving signal generator, configured to output a plurality of source driving signals according to the video data.

7. The source driver according to claim 1, wherein the terminal circuit comprises:
    a plurality of resistors having different resistances; and
    a selection circuit, configured to select some of the resistors according to the setting command.

8. The source driver according to claim 1, wherein the setting command is inserted in the bus signal being received from the timing controller by the source driving circuit, and the bus signal includes video data.

9. A setting method applied to a source driver, wherein the source driver is configured to drive a display panel, and the method comprises steps of:
    setting an adjustable resistance, which is coupled between a transmission line and a source driving circuit, in response to a setting command, wherein the setting command is represented by a bus signal during a setting period;
    receiving video data, as represented by the bus signal, from a timing controller during a transfer period after a setting period; and
    providing the adjustable resistance according to the setting command during the transfer period,
    wherein the setting period being used for setting the adjustable resistance according to the setting command is before the transfer period being used for transmitting the video data, and the setting command sets the adjustable resistance with one of a plurality of resistances for impedance matching.

10. The setting method according to claim 9, wherein the adjustable resistance is set for impedance matching with the transmission line and another transmission line, which are coupled to the timing controller.

11. The setting method according to claim 9, wherein the adjustable resistance is set to different values depending upon resistances of the transmission line and the another transmission line, wherein the transmission line and the another transmission are coupled to the timing controller, and the resistances of the transmission line and the another transmission line are different.

12. A source driver for driving a display panel, comprising:
    a source driving circuit; and
    a terminal circuit, configured to be coupled to a transmission line of a multi-drop bus and the source driving circuit, wherein the terminal circuit is configured to
    provide an adjustable resistance, being set in response to a setting command represented by a bus signal transmitted on the multi-drop bus, during a first period, and
    stop providing the adjustable resistance during a second period,
    wherein the first period comprises a transfer period during which video data, as represented by the bus signal, is received by the source driving circuit,
    wherein a setting period being used for setting the adjustable resistance according to the setting command is before the transfer period being used for transmitting the video data, and the setting command sets the adjustable resistance with one of a plurality of resistances for impedance matching.

13. The source driver according to claim 12, wherein the adjustable resistance is set to different values depending upon resistances of the transmission line and at least one other transmission line on the multi-drop bus.

14. The source driver according to claim 12, wherein the setting command is inserted in the bus signal which includes the video data.

* * * * *